US009382923B2

(12) United States Patent
Carlin et al.

(10) Patent No.: US 9,382,923 B2
(45) Date of Patent: Jul. 5, 2016

(54) LOAD ENERGY ASSIST AND HORSEPOWER MANAGEMENT SYSTEM

(71) Applicant: Eaton Corporation, Cleveland, OH (US)

(72) Inventors: Jerry Faye Carlin, Searcy, AR (US); Robin Francis Ireton, Searcy, AR (US); Wade Leo Gehlhoff, Shakopee, MN (US); Leif Pedersen, Waukesha, WI (US)

( * ) Notice: Subject to any disclaimer, the term of this patent is extended or adjusted under 35 U.S.C. 154(b) by 282 days.

(21) Appl. No.: 13/890,565

(22) Filed: May 9, 2013

(65) Prior Publication Data

US 2013/0298541 A1 Nov. 14, 2013

Related U.S. Application Data

(60) Provisional application No. 61/645,435, filed on May 10, 2012.

(51) Int. Cl.
*F16D 31/02* (2006.01)
*F15B 1/04* (2006.01)
(Continued)

(52) U.S. Cl.
CPC ................. *F15B 1/04* (2013.01); *F15B 11/003* (2013.01); *F15B 11/0445* (2013.01); *F15B 11/161* (2013.01); *F15B 2211/20546* (2013.01); *F15B 2211/30505* (2013.01); *F15B 2211/30515* (2013.01); *F15B 2211/30535* (2013.01); *F15B 2211/3122* (2013.01); *F15B 2211/3144* (2013.01); *F15B 2211/40515* (2013.01); *F15B 2211/41527* (2013.01); *F15B 2211/426* (2013.01); *F15B 2211/46* (2013.01);
(Continued)

(58) Field of Classification Search
CPC .... F15B 11/003; F15B 11/0445; F15B 11/05; F15B 11/161
USPC ............................... 60/460, 461; 91/445, 466
See application file for complete search history.

(56) References Cited

U.S. PATENT DOCUMENTS 4,542,678 A 9/1985 Kochendörfer et al.
4,733,600 A * 3/1988 Masano ...................... 91/358 A
(Continued)

FOREIGN PATENT DOCUMENTS

GB 2 351 778 A 1/2001

OTHER PUBLICATIONS

International Search Report and Written Opinion for PCT/US2013/040297 mailed Aug. 5, 2013.

*Primary Examiner* — Michael Leslie
(74) *Attorney, Agent, or Firm* — Merchant & Gould P.C.

(57) ABSTRACT

A hydraulic circuit for lifting and lowering a load is disclosed. The hydraulic circuit may include a hydraulic pump, a fluid reservoir, a load-sense valve, and a hydraulic actuator having a first chamber and a second chamber. The hydraulic circuit may also include a first control valve assembly having first and second lowering positions, the valve being disposed between the hydraulic pump and the hydraulic actuator. A second control valve assembly may also be provided that is disposed between the first control valve assembly and the first chamber of the hydraulic actuator. In one embodiment, the second control valve assembly has a first position and a second position. In one embodiment, the load can be selectively lowered by the hydraulic circuit without use of the hydraulic pump when the first control valve assembly is in the first lowering position and the second control valve assembly is in the second position.

9 Claims, 16 Drawing Sheets

(51) Int. Cl.
*F15B 11/00* (2006.01)
*F15B 11/16* (2006.01)
*F15B 11/044* (2006.01)

(52) U.S. Cl.
CPC ... *F15B2211/634* (2013.01); *F15B 2211/6306* (2013.01); *F15B 2211/6313* (2013.01); *F15B 2211/6346* (2013.01); *F15B 2211/761* (2013.01); *F15B 2211/8609* (2013.01); *F15B 2211/88* (2013.01)

(56) References Cited

U.S. PATENT DOCUMENTS

| | | | | |
|---|---|---|---|---|
| 5,442,912 | A | 8/1995 | Hirata et al. | |
| 7,487,707 | B2 * | 2/2009 | Pfaff et al. ...................... | 91/445 |
| 7,562,615 | B2 | 7/2009 | Abe et al. | |
| 7,905,088 | B2 * | 3/2011 | Stephenson et al. ............ | 60/414 |
| 2005/0051024 | A1 | 3/2005 | Nielsen et al. | |

* cited by examiner

LOAD ENERGY ASSIST AND HORSEPOWER MANAGEMENT SYSTEM

CROSS REFERENCE TO RELATED APPLICATIONS

This application claims the benefit of U.S. Provisional Application No. 61/645,435, filed May 10, 2012, and titled "Load Energy Assist and Horsepower Management System," the disclosure of which is hereby incorporated herein by reference in its entirety.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. It is common in such machines for the hydraulic pump to provide fluid power to a variety of valves within the hydraulic system. Improvements are desired. For example, many systems are configured such that pumping power must be increased in order to lower a load supported by the work implement.

SUMMARY

A hydraulic circuit for lifting and lowering a load is disclosed. The hydraulic circuit may include a hydraulic pump, a fluid reservoir, a load-sense valve, and a hydraulic actuator having a first chamber and a second chamber. The hydraulic circuit may also include a first control valve assembly disposed between the hydraulic pump and the hydraulic actuator. A second control valve assembly may also be provided that is disposed between the first control valve assembly and the first chamber of the hydraulic actuator. In one embodiment, the second control valve assembly has a first position and a second position. In the first position, hydraulic fluid is blocked from exiting the first chamber, but is allowed to flow into the first chamber. In the second positions, hydraulic fluid is allowed to enter or exit the first chamber of the hydraulic actuator. The first control valve assembly is also movable to a first lowering position wherein the second control valve assembly is in fluid communication with the fluid reservoir through the first control valve assembly, the second chamber of the hydraulic actuator is blocked from flowing through the first control valve assembly, and the hydraulic pump is placed in fluid communication with the load-sense valve. In one embodiment, the load can be selectively lowered by the hydraulic circuit without requiring the hydraulic pump to provide output pressure and/or fluid flow when the first control valve assembly is in the first lowering position and the second control valve assembly is in the second position. An electronic controller and algorithms for operating the first and second control valve assemblies is also disclosed.

A method of operating a hydraulic circuit is also disclosed. In one step of the method, a first control valve assembly in fluid communication with a hydraulic actuator and a hydraulic pump is provided. In one embodiment, the first control valve has a first lowering position and a second lowering position. Another step in the method can be providing a second control valve assembly disposed between the first control valve assembly and the hydraulic actuator. In further steps, a user indication that a load lowering operation is desired is received and it is determined whether a pressure in the hydraulic cylinder is greater than a load-sense pressure associated with the first control valve assembly by a pressure margin value. In one embodiment, the comparison is alternatively made between the hydraulic cylinder pressure and a pressure near a first outlet port of the first control valve assembly. Where the pressure in the hydraulic cylinder is greater than the load-sense pressure by a pressure margin, the first control valve assembly can be actuated to the first lowering position and the second control valve assembly can be proportionally controlled to maintain a pressure differential set point such that the load is selectively lowered by gravity without requiring the hydraulic pump to provide an output, such as flow or pressure. Where the pressure in the hydraulic cylinder is lower than the load-sense pressure by a pressure margin, the first control valve assembly can be actuated to the second lowering position and the second control valve assembly can be controlled to maintain a pressure at the hydraulic cylinder such that the load can be lowered with power from the hydraulic pump.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
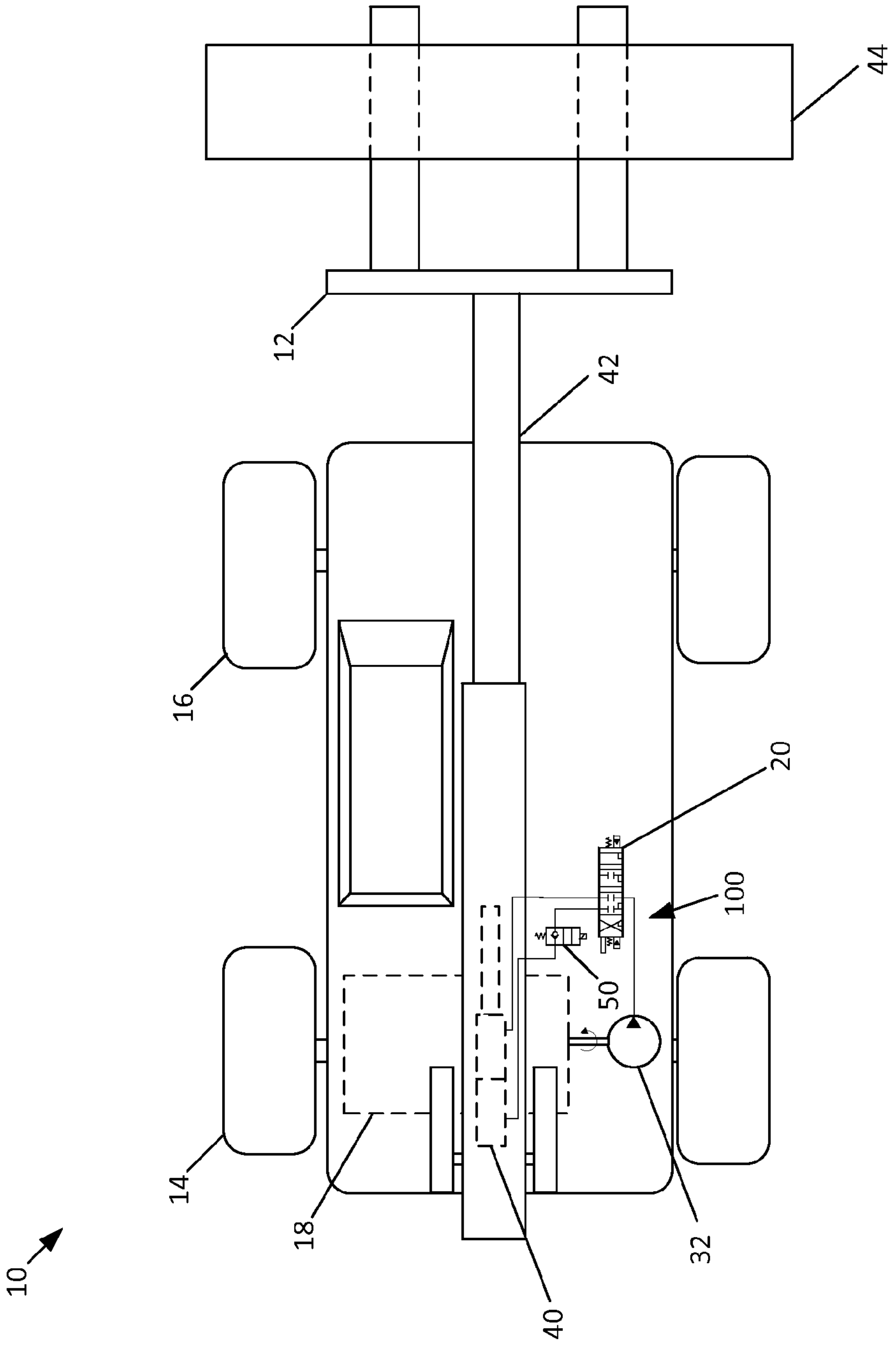
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views.

Reference to various embodiments does not limit the scope of the claims attached hereto. Additionally, any examples set forth in this specification are not intended to be limiting and merely set forth some of the many possible embodiments for the appended claims.

General Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a work circuit 100 and a steering circuit (not shown) of the work machine 10 via at least one hydraulic pump 32. In one embodiment, pump 32 is mechanically coupled to the engine 18, such as by an output shaft or a power take-off. In one embodiment, pump 32 is powered indirectly by the engine 18 via a hydraulic system. The work circuit 100 actuates the work attachment 12 by operation of the pump in cooperation with a number of hydraulic actuators 40 and control valves 20, 50. In one embodiment, the work machine includes hydraulic actuators and valves for effectuating lifting, extending, tilting, and sideways motions of the work attachment 12.

The Work Circuit

Figure 2:
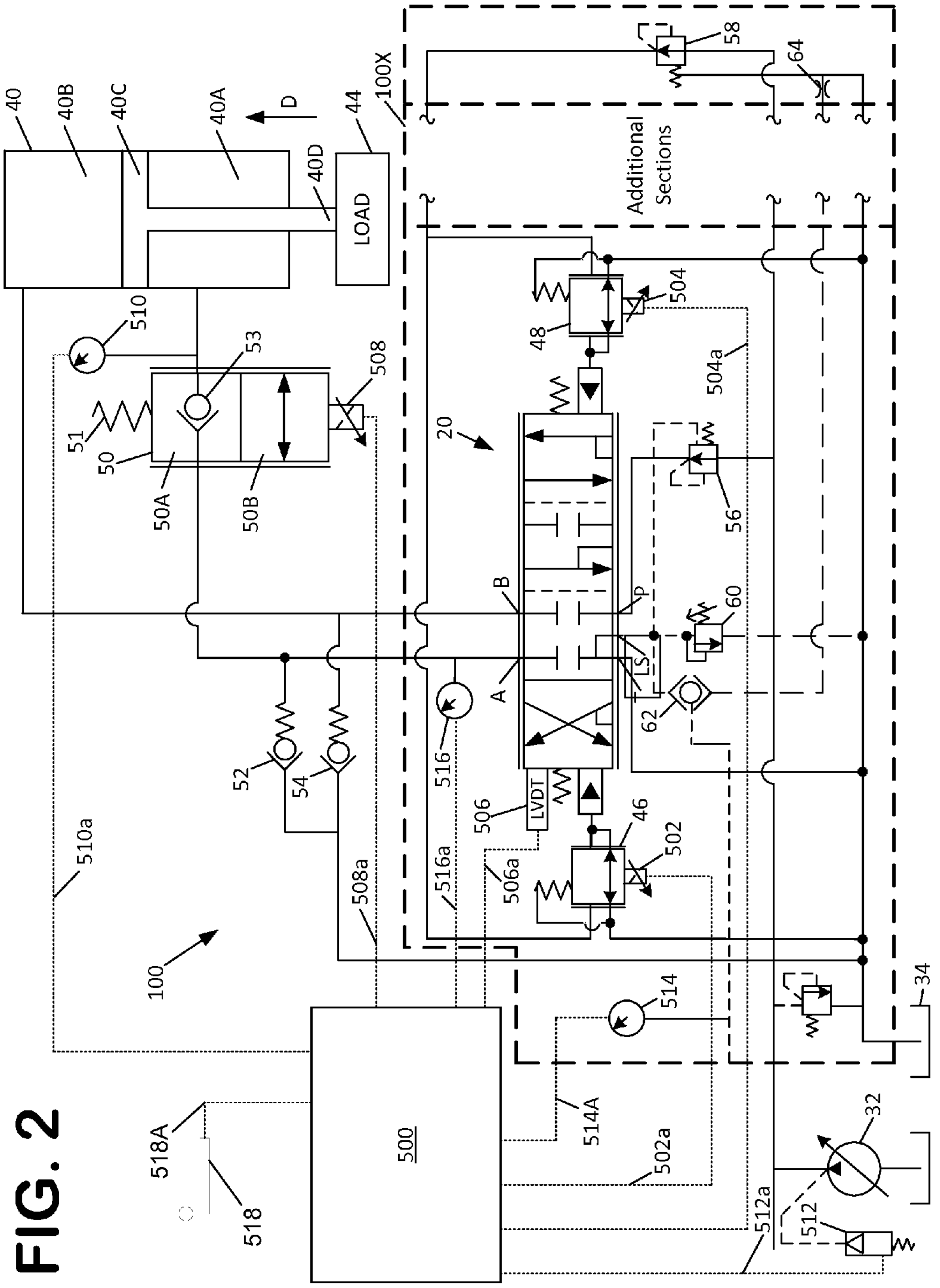
FIG. 2 is a schematic view of a hydraulic circuit suitable for use in the work machine shown in FIG. 1.

Referring to FIG. 2, examples of a work circuit 100 and other components of the hydraulic system are shown. Work circuit 100 is for activating at least one hydraulic actuator 40 of a work machine 10 against the load 44. As shown, the hydraulic actuator has a piston 40C attached to a piston rod 40D. The piston 40C divides the hydraulic actuator into a first chamber 40A and a second chamber 40B. When hydraulic fluid is injected into the first chamber 40A of the hydraulic cylinder 40 at a sufficient pressure, the piston rod 40D will cause the load 44 to be lifted in a first direction D, assuming an equal volume of hydraulic fluid is allowed to escape the second chamber 40B.

As shown, work circuit 100 includes a first valve assembly 20 for enabling a work function, such as an attachment lift function. Work circuit 100 may also include a plurality of additional sections 100X including valves and/or fluid power consuming components for enabling other functions in the hydraulic system. In the particular embodiment shown, first valve assembly 20 is a proportional valve having a body 22 (shown in FIGS. 6-9) within which a spool 24 is disposed in a central bore, as most easily seen at FIG. 3. It is noted that body 22 may be a cast and/or machined body, or may be provided as a sleeve. Other types of valves are possible as well.

The first valve assembly 20 is configured and arranged to selectively provide pressurized fluid from pump 32 to one or more hydraulic lift or work cylinders 40 which are mechanically coupled to the work attachment 12. Although cylinders 40 are characterized in this disclosure as being lift cylinders, it should be understood that cylinders 40 may be any type of work cylinder, and that the disclosure is not limited to only applications involving lift cylinders. The operation of first valve assembly 20 causes the work attachment 12 to be selectively raised or lowered in a lifting function. The lifting speed of the lift cylinder 40 is a result of the flow through the first valve assembly 20.

The work circuit further includes a second valve assembly 50. As shown, the first valve assembly 50 is a two-position, two-way valve in fluid communication with a first chamber 40A of the hydraulic cylinder 40 and the first control valve assembly 20. In one embodiment, the second control valve assembly 50 is spring biased by a spring 51 into a first position 50A and powered into a second position 50B via a solenoid actuator 508 in communication with a control system 500, discussed later, via a control line 508*a*. When the second control valve assembly 50 is in the first position 50A, hydraulic fluid is prevented from flowing through the valve assembly 50 from the first chamber 40A of the hydraulic actuator 40 by operation of an internal check valve 53. Accordingly, the second valve assembly 50, when in the first position, prevents the hydraulic cylinder 40 from lowering. In the second position 50B, hydraulic fluid may flow from the first chamber 40A through the second control valve assembly 50 from the first chamber 40A of the hydraulic actuator 40. In one embodiment, the second valve assembly 50 may be bi-directional.

In the embodiment shown, the first valve assembly 20 is pilot operated with pressurized fluid generated by pump 32, but at a controlled pressure, as determined by pressure reducing or relief valves 58. In one embodiment, pilot pressure may be supplied by an alternate source. As shown, a pair of solenoid operated valves 46, 48 are provided downstream of the valve 58. The valves 46, 48 selectively provide pilot pressure to either end of the spool 24 to actuate the first valve assembly 20. As shown, the valves 46, 48 are spring biased into a closed position and are powered to an open position by a pair of solenoid actuators 502, 504, respectively. The solenoid actuators 502, 504 are in electronic communication with the control system 500 via control lines 502*a* and 504*a*, respectively. It is noted that the spool 24 of first valve assembly 20 may be configured to be directly acted upon by solenoid actuators 502, 504 as well.

As shown, the first valve assembly 20 is a four-position, five-way valve in fluid communication with the pump 32, a tank or fluid reservoir 34, and the hydraulic actuator 40. In the embodiment shown, first valve assembly 20 is movable from a lifting position 20A, to a closed or neutral position 20B, to a first lowering position 20C, and to a second lowering position 20D. As shown, the first valve assembly is spring biased to the closed position 20B by spring(s) 21. In one embodiment, a single capture spring may be used while in another embodiment a pair of springs 21 may be used.

Figure 3:
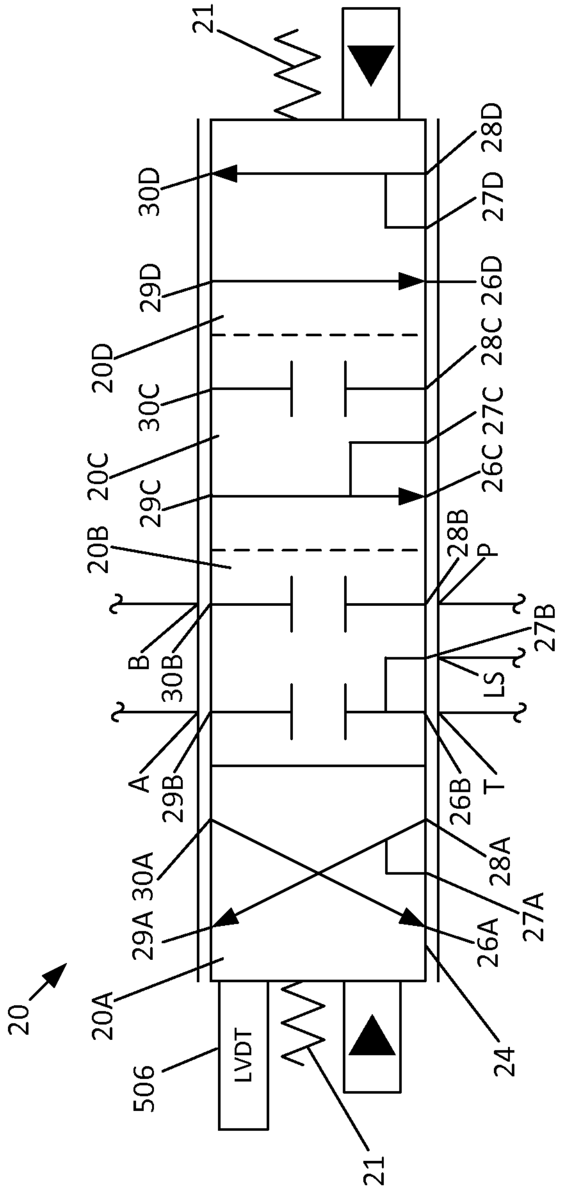
FIG. 3 is a schematic view of a control valve assembly suitable for use in the hydraulic circuit shown in FIG. 2.

Referring to FIGS. 5-9, an exemplary physical embodiment of the first valve assembly 20 is shown, the operation of which is shown schematically at FIG. 3. As configured, the body 22 of first valve assembly 20 has: a tank passage T configured to be placed in fluid communication with the fluid reservoir 34; a load-sense passage LS configured to be placed in fluid communication with the load-sense valve 62; a pump passage P configured to be placed in fluid communication with the pump 32; a first outlet port A in fluid communication with the first chamber 40A of the hydraulic cylinder 40 via the second valve assembly 50; and a second outlet port B configured to be placed in fluid communication with the second chamber 40B of the hydraulic cylinder. In one embodiment, the tank, load-sense, and pump passages could be external ports. The first control valve assembly 20 is also shown as having a first recess 21*a* for receiving captured spring 21. In one embodiment, there could be two centering springs. A first pilot port 46*a* and a second pilot port 48*a* are also shown for receiving pilot pressure from the valves 46 and 48, respectively. It is noted that the above referenced ports for the valve assembly 20 and body 22 correspond to ports provided on the spool 24, depending upon the position of the spool. For example: the first outlet port A can be selectively opened to ports 29A-D; the second outlet port B can be selectively opened to ports 30A-D; the pump passage P can be selectively opened to ports 28A-D; the tank passage T can be selectively opened to ports 26A-D; and the load-sense passage LS can be selectively opened to ports 27A-D. The various spool positions and functions are described in further detail below.

In the lifting position 20A, the first valve assembly 20 is positioned such that ports 28A and 29A are placed in fluid communication with each other. The spool 24 of the first valve assembly 20 is shown as being in the lifting position 20A in FIG. 9. This position allows for the pump 32 to be placed in fluid communication with a first chamber 40A of the hydraulic lift cylinder 40 via a second valve assembly 50, discussed later. Where the pump pressure exceeds the pressure induced by a load 44, the hydraulic lift cylinder will cause the load 44 to be raised. The lifting position A further places ports 27A and 28A in fluid communication with each other. This allows for the pump pressure, in combination with an output of a pressure compensator 56 in fluid communication with port 28A, to provide an input to a load-sense shuttle valve 62. The load-sense shuttle valve 62, is in communication with load-sense decompression orifice 64 which relieves pressure to tank 34 when one valve section is working Load-sense decompression orifice 64 is also used to bleed load-sense signal when no sectional valve is working. The load sense shuttle valve 62, is also in communication with the controller 500 via pressure sensor 514 and control line 514A. The lifting position 20A also places ports 26A and 30A in fluid communication with each other such that hydraulic fluid on the second chamber 40B of the hydraulic lift cylinder 40 can drain to the fluid reservoir 34 through the first valve assembly 20.

In the closed position 20B, ports 26B, 28B, 29B, and 30B are closed such that the pump 32 and fluid reservoir 34 are both isolated from the lifting cylinder 40. The spool 24 of the first valve assembly 20 is shown as being in the closed position 20B in FIG. 6. In this position the work attachment 12 can neither be raised nor lowered. Additionally, ports 26B and 27B are placed in fluid communication with each other such that the load-sense valve 62 is exposed to tank pressure at both inputs.

In the first lowering position 20C, the first valve assembly 20 is positioned such that ports 29C, 26C and 27C are placed in fluid communication with each other. The spool 24 of the first valve assembly 20 is shown as being in the first lowering position 20C in FIG. 7. When the second control valve assembly 50 is in the second position 50B and the first control valve assembly 20 is in the first lowering position 20C, hydraulic fluid may drain from the first chamber 40A of the cylinder 40 to the fluid reservoir 34, thus allowing lowering of the load 44 by gravity alone. The first lowering position 20C also blocks ports 28C and 30C and places ports 26C, 27C and 29C in fluid communication with each other.

In the second lowering position, ports 26D and 29D are placed in fluid communication with each other, as are ports 27D, 28D and 30D, in a similar arrangement to that shown and described for the first lowering position 20C. The spool 24 of the first valve assembly 20 is shown as being in the second lowering position 20D in FIG. 8. However, ports 28D and 30D are now placed in fluid communication with each other in the second lowering position 20D instead of being blocked. With ports 27D, 28D and 30D in fluid communication with each other, the pump 32 is now in fluid communication with the second chamber 40B of the hydraulic cylinder such that the load 44 can be additionally lowered with pump pressure with the second valve assembly 50 is in the second position 50B.

Figure 6:
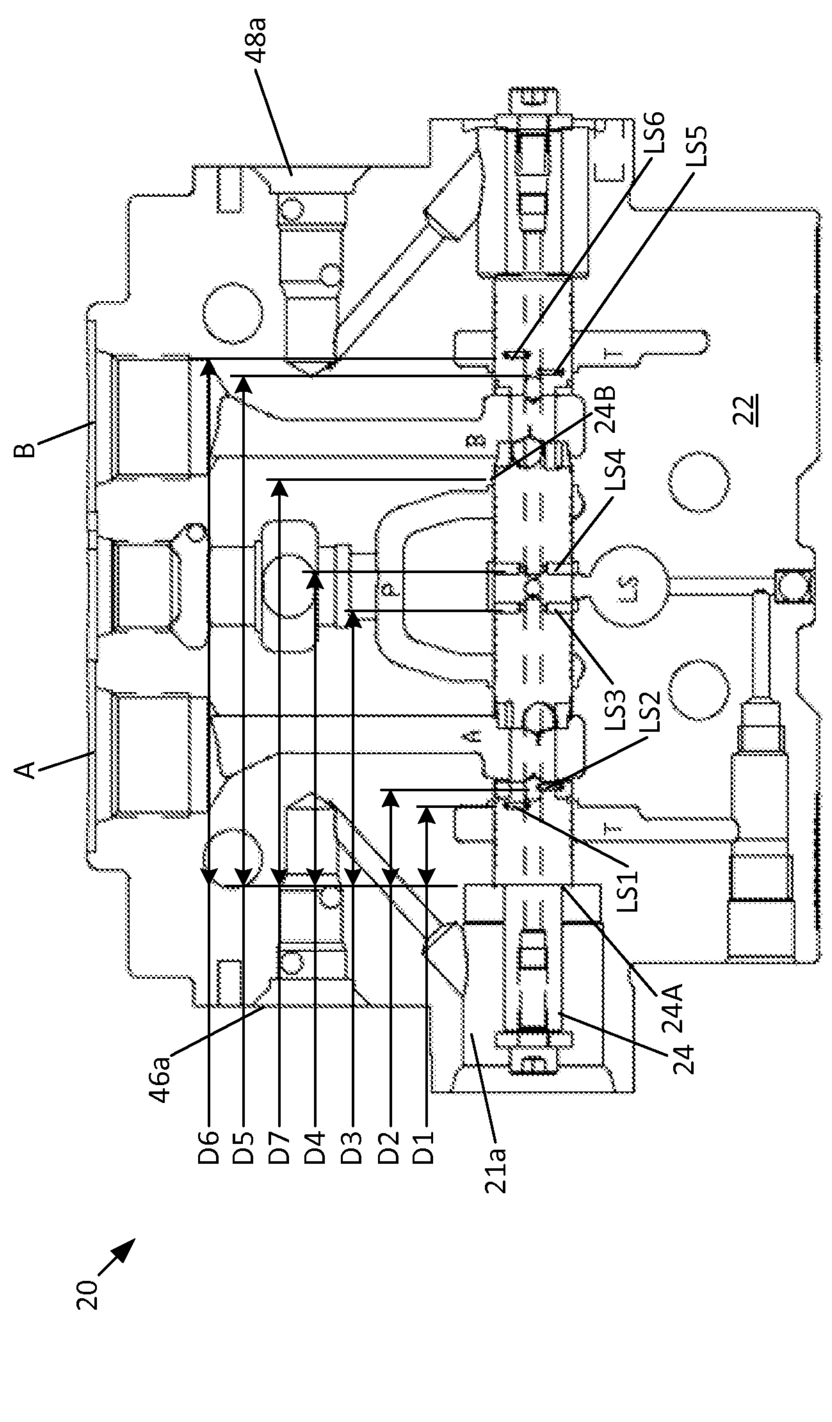
FIG. 6 is a cross-sectional view of the valve assembly shown in FIG. 5, with the valve assembly in a second position.
Figure 7:
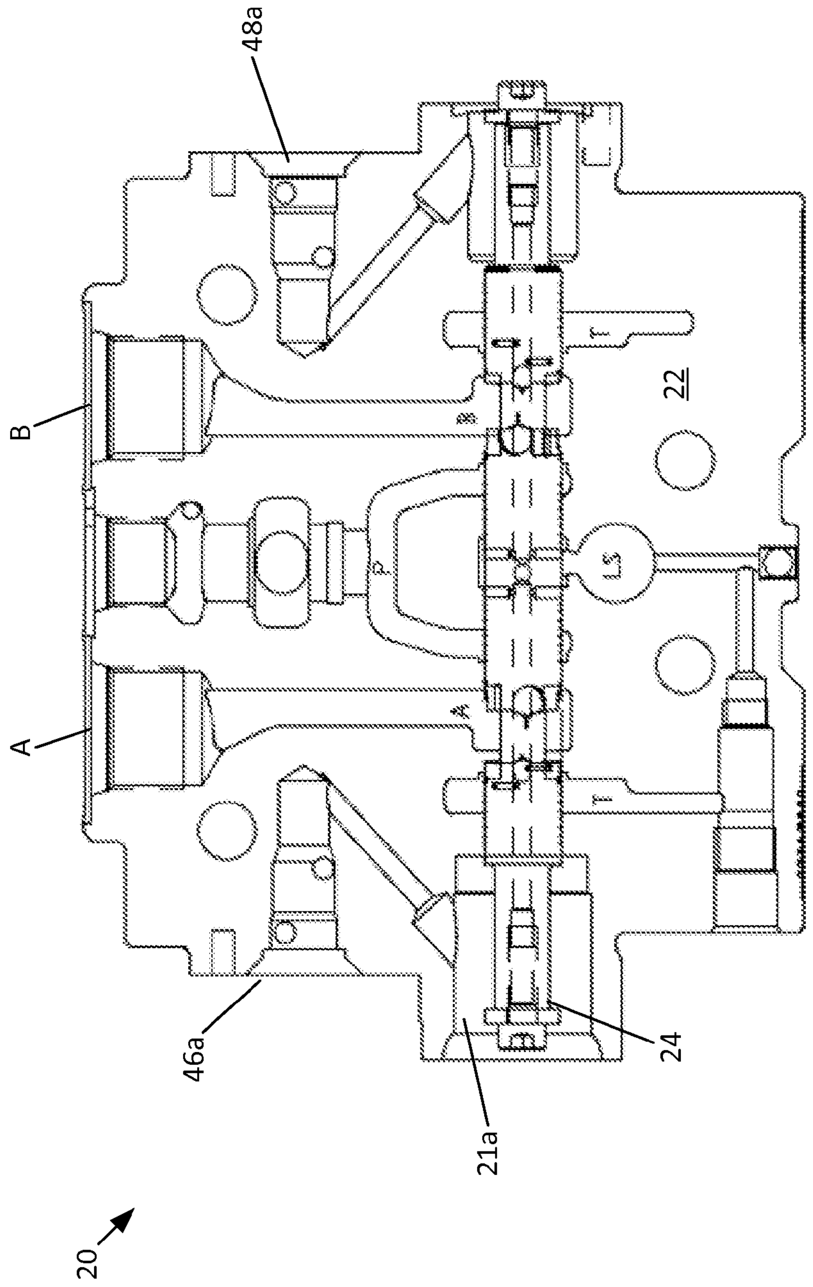
FIG. 7 is a cross-sectional view of the valve assembly shown in FIG. 5 with the valve assembly in a third position.
Figure 8:
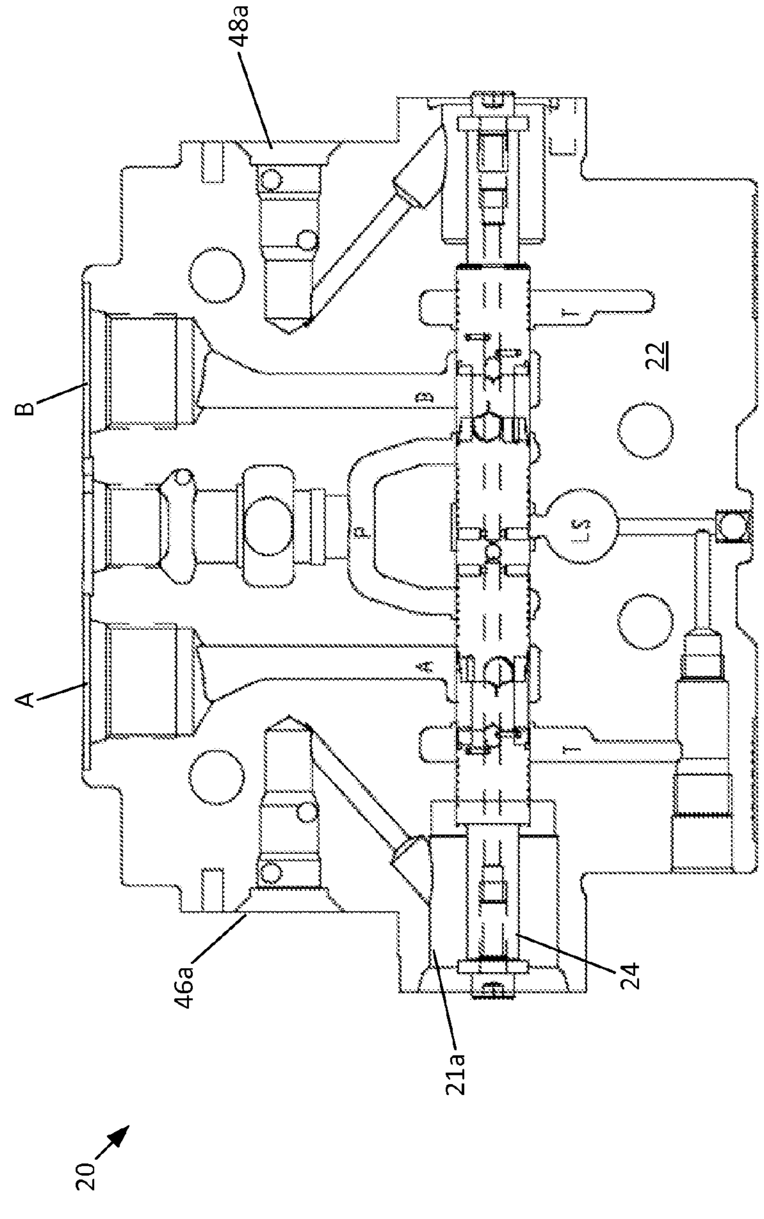
FIG. 8 is a cross-sectional view of the valve assembly shown in FIG. 5 with the valve assembly in a fourth position.
Figure 9:
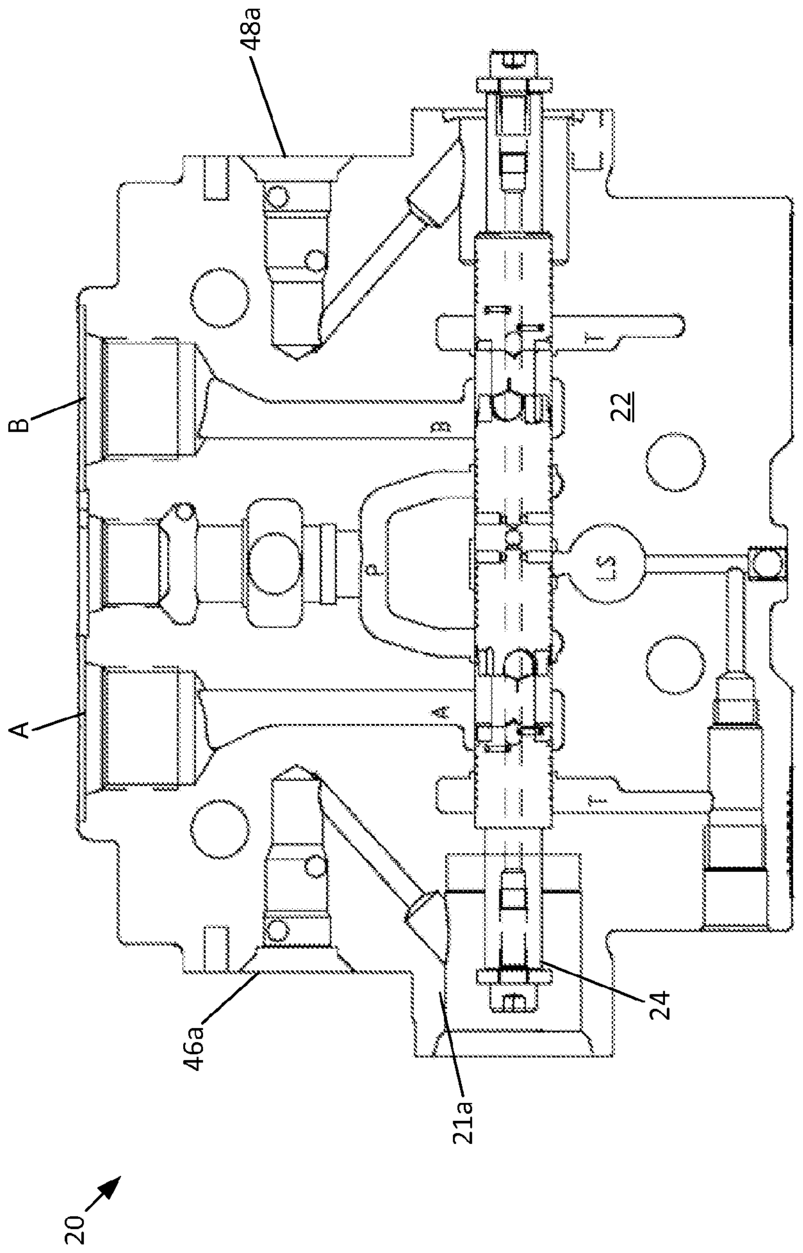
FIG. 9 is a cross-sectional view of the valve assembly shown in FIG. 5 with the valve assembly in a first position.

Referring specifically to FIG. 6, physical load-sense orifices LS1, LS2, LS3, LS4, LS5, and LS, in fluid communication with internal passageways of the spool 24, are shown. The load sense orifices LS1-LS6 are configured with a timing to enable the load sense port LS to be selectively placed in fluid communication with the pump port P and the tank port T in the manner described above for ports 27A-27D. In the exemplary embodiment shown the load sense orifices LS1, LS2, LS3, LS4, LS5, and LS6 are a distance D1, D2, D3, D4, D5, and D6 from an edge 24A of the spool 24, respectively. In one embodiment, D1 is about 15.0 millimeters (mm); D2 is about 17.6 mm; D3 is about 49.5 mm; D4 is about 56.5 mm; D5 is about 91.0 mm; and D6 is about 93.6 mm. In one embodiment, LS1, LS2, LS5, and LS6 have a diameter of about 1.0 mm while LS3 and LS4 have a diameter of about 2.0 mm. In one aspect, the distances and diameters are subjective to the requirements of the work implement.

Referring back to FIG. 2, the hydraulic circuit 100 is also provided with anti-cavitation valves 52, 54, shown in the drawings as being spring loaded check valves. As arranged, valve 52 allows for fluid flow to flow from the fluid reservoir 34 to the second chamber 40B of the actuator 40 while valve 54 allows for fluid to flow from the fluid reservoir 34 to the first chamber 40A of the actuator 40. Accordingly, regardless of whether the flow path through the first valve assembly 20 is blocked, the anti-cavitation valves 52, 54 will prevent cavitation in the hydraulic cylinder 40. Referring to FIG. 6, the B port timing of the valve spool 24 is such that fluid is prevented from entering chamber 40B thereby allowing the anti-cavitation check valves 52, 54 to fill chamber 40B from the reservoir 34. In the embodiment shown, this is accomplished by spacing a second edge 24B of the spool 24 by a distance D7 from the first edge 24A. In the embodiment shown, D7 is about 74.00 mm.

The work circuit 100 is further shown as having additional control components. For example, a first pressure sensor 510 disposed between the lifting cylinder 40 second chamber 40B and the second valve assembly 50. This sensor is placed in communication with the electronic controller 500 via control line 510*a*. First pressure sensor 510 provides the controller 500 with an input for the pressure in the hydraulic lifting cylinder 40 on the second chamber 40B. Another pressure sensor 516 is shown as being disposed between the lifting cylinder 40 first chamber 40A and the A port of the first valve assembly 20. This sensor 516 is placed in communication with the electronic controller 500 via control line 516*a*. Pressure sensor 516 is an optional sensor that can provide the controller 500 with an input for the pressure in the hydraulic lifting cylinder 40 on the first chamber 40A when the second valve assembly 50 is in the open position 50B for improved flow control.

The work circuit 100 is further shown as having a pump controller 512 in communication with electronic controller 500 via control lines 512*a*. The work circuit 100 is further shown as having a position sensor 506 on the first valve assembly spool 24 that is in communication with the controller 500 via control line 506A. Additionally, the control system 500 can also be configured to receive a lever position input 518 such that it can be determined whether the operator desires to lower or raise the load 44. Additional control components are possible.

The Electronic Control System

The hydraulic system 100 operates in various modes depending on demands placed on the work machine 10 (e.g., by an operator). The electronic control system monitors various sensors and other inputs, and allows for the various modes to be initiated at appropriate times. The modes include a lifting mode, a work stand-by mode, and a lowering mode.

Figure 4:
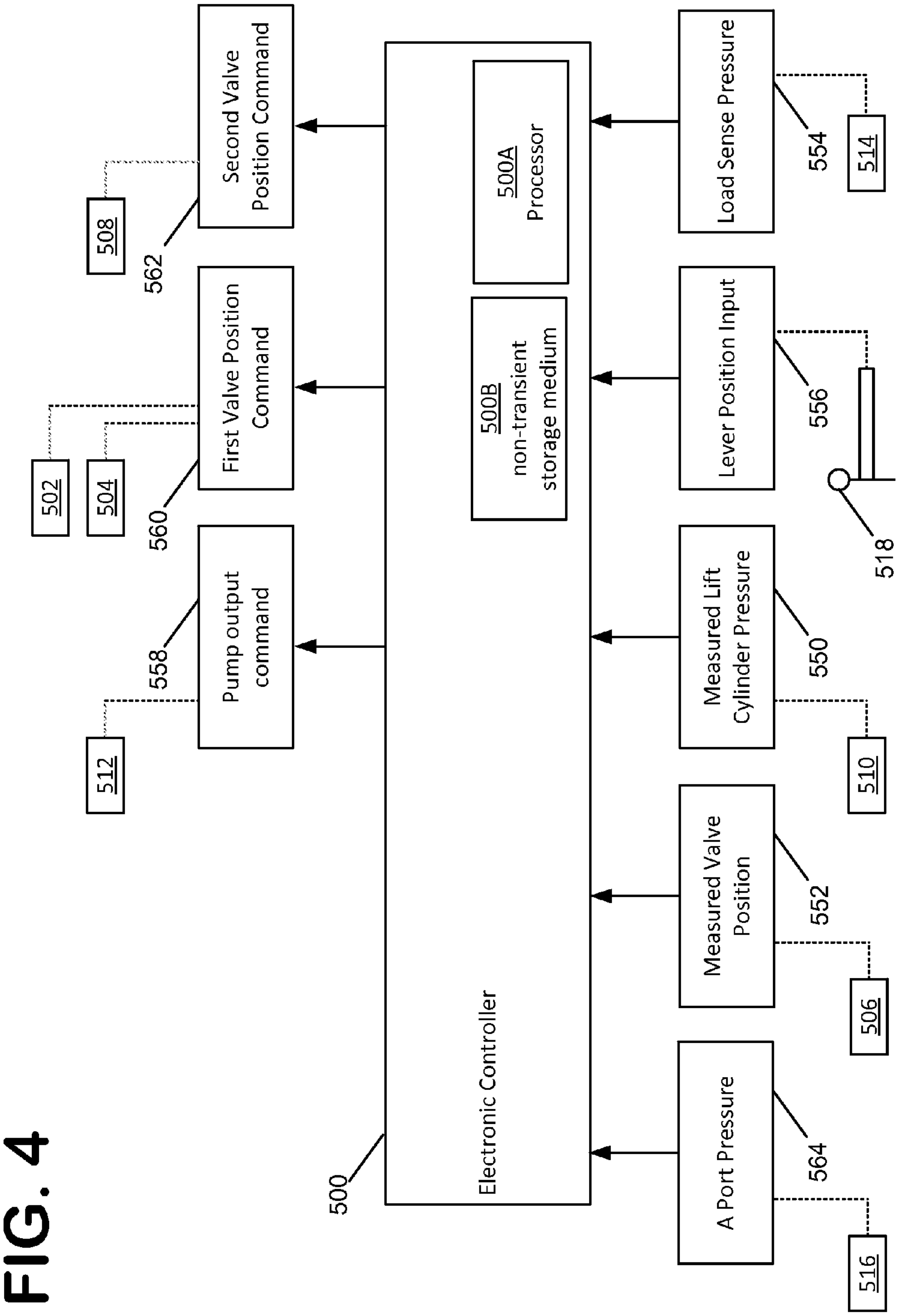
FIG. 4 is a schematic of an electronic control system for the hydraulic circuit shown in FIG. 2.
Figure 5:
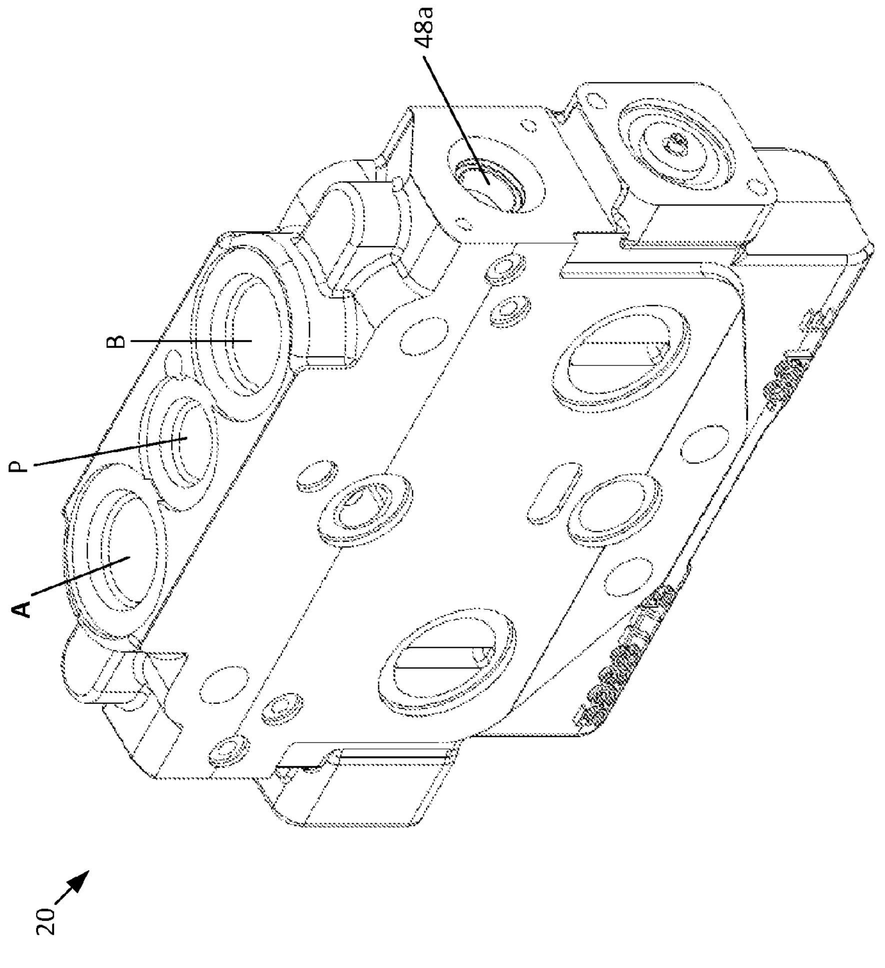
FIG. 5 is a perspective view of a first physical embodiment of the valve assembly shown in FIG. 2.

Referring to FIG. 4, the electronic controller 500 is schematically shown as including a processor 500A and a non-transient storage medium or memory 500B. Memory 500B is for storing executable code, the operating parameters, and the input from various inputs while processor 500A is for executing the code. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Still referring to FIG. 4, Electronic controller 500 is schematically shown as having a number of inputs and outputs that may be used for implementing the various modes of operation. As stated above, one of the inputs is the measured lift cylinder pressure 550 provided by pressure sensor 510. Another input is the measured valve position 552, as measured by position sensor 506, which may be an LVDT sensor. The position sensor 506 may be used to control the position of the second valve assembly 50 and/or to provide feedback to the controller to improve timing. Yet another input is the load-sense pressure input 554 provided by sensor 514. Another input into the electronic controller 500 is the pressure input 564 from pressure sensor 516. The electronic controller 500 can also be configured to receive a lever position input 556 from a lifting lever 518. In one embodiment, the lever position input is a direct digital or analog signal from an electronic lever. The lifting lever 518 provides a user indication to the controller 500 that a load lifting or lowering operation by hydraulic lift cylinder 40 is desired. Although lever 518 is characterized as a lifting lever, it should be understood that the disclosure is not limited to only lifting levers and that lever 518 can be any type of work lever without departing from the concepts disclosed herein. One skilled in the art will understand that many other inputs are possible. For example, measured engine speed may be provide as a direct input into the electronic controller 500 or may be received from another portion of the control system via a control area network (CAN). The measured pump displacement, for example via a displacement feedback sensor, may also be provided.

Still referring to FIG. 4, a number of outputs from the electronic controller 500 are shown. One output is a pump output command 558 which is for adjusting the output pressure of the pump 32. In one embodiment, pump pressure output can be controlled by adjusting the angle of the swash plate in a variable displacement axial piston pump. However, many other types of pumps and controls known in the art may be utilized, for example a gear pump with an open center inlet. Another output is the valve position command 560 which sends signals to actuators 502, 504 depending upon the desired first valve assembly 20 position. The position of the second valve assembly 50 is also commanded by the controller 500 via output 562. In the particular embodiment shown, the valve command outputs 560, 562 are in the form of a proportional signal to the solenoid valves such that the valve position may be modulated. The proportional signal may be in the form of pulse width modulation and can be any other type of signal without departing from the concepts presented herein.

The electronic controller 500 may also include a number of maps or algorithms to correlate the inputs and outputs of the controller 500. For example, the controller 500 may include an algorithm to control the pump output pressure and the position of the first valve assembly 20 based on the measured pressures at sensor 510 and load-sense valve 62 via sensor 514. In one embodiment, the controller 500 includes an algorithm to control the system in a lifting mode and a lowering mode, as described further in the Method of Operation section below.

The electronic controller 500 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Method of Operation

Figure 10:
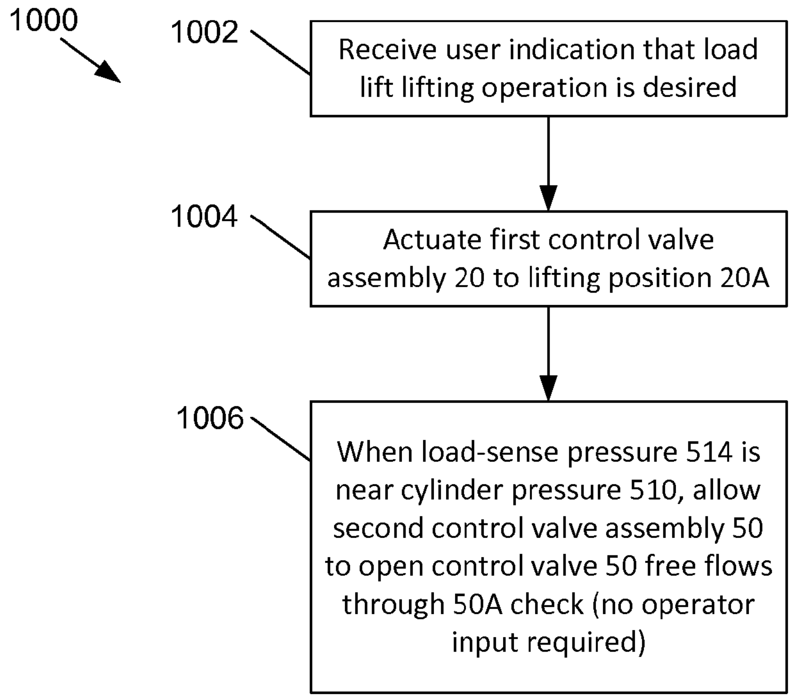
FIG. 10 is a process flow chart showing a lifting method of operation of the work circuit shown in FIG. 2.
Figure 11:
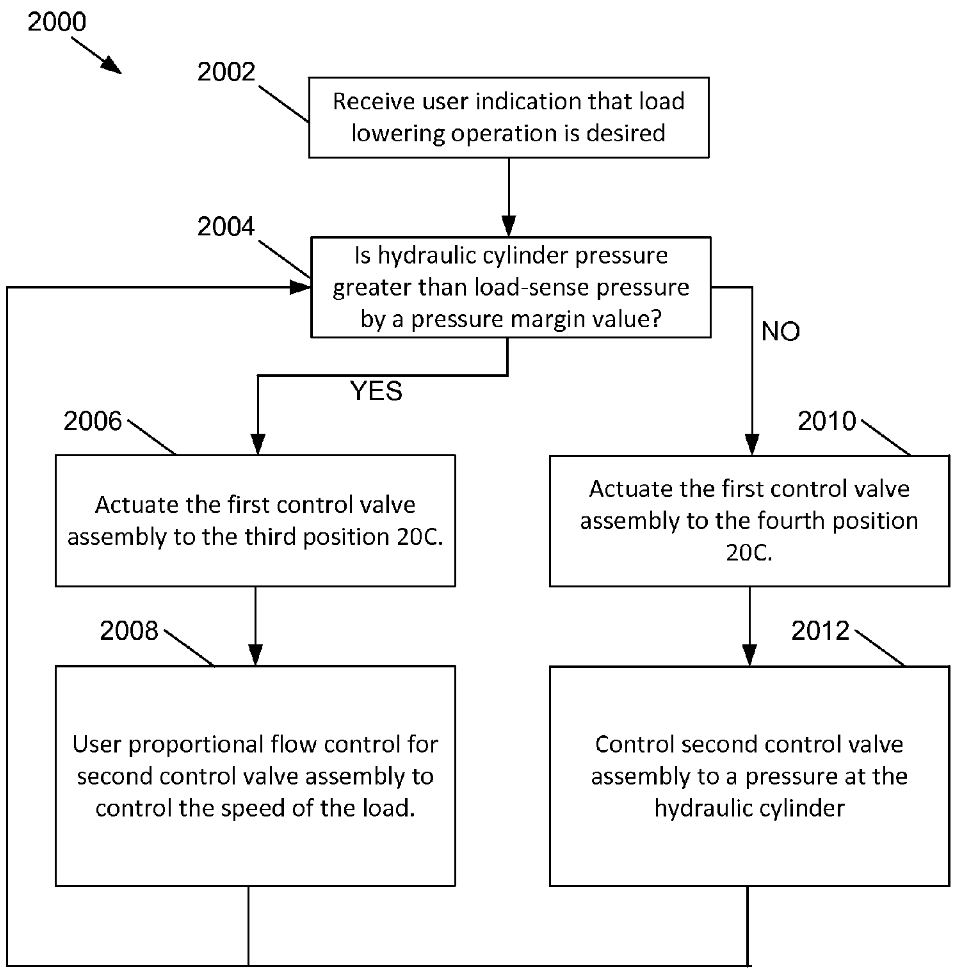
FIG. 11 is a process flow chart showing a lowering method of operation of the work circuit shown in FIG. 2.
Figure 12:
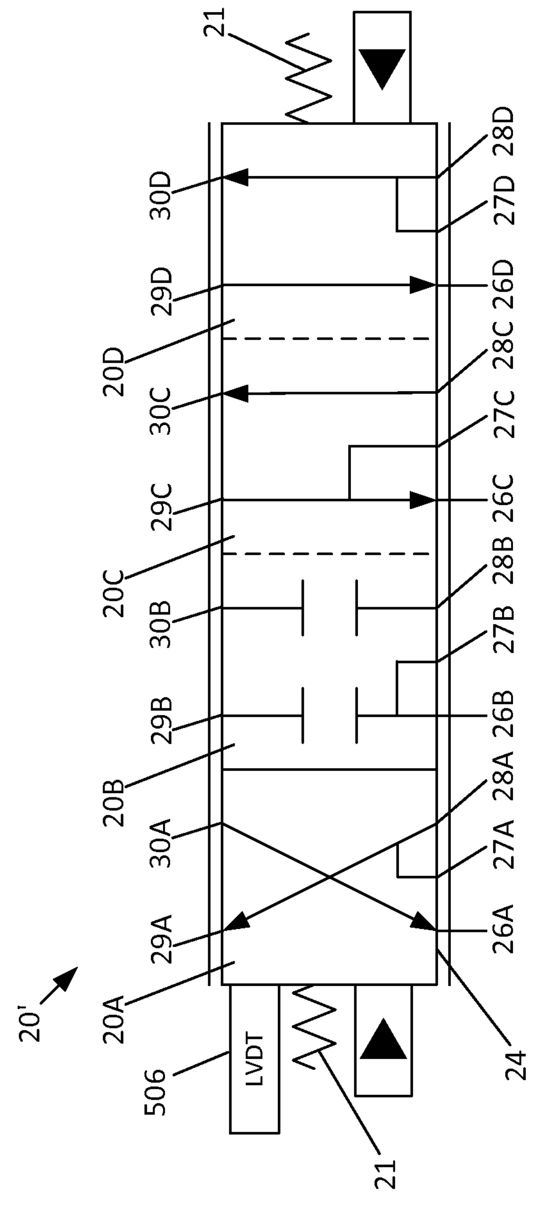
FIG. 12 is a schematic view of a second embodiment of a control valve assembly suitable for use in the hydraulic circuit shown in FIG. 2.

Referring to FIGS. 10 and 11, methods of operating the hydraulic circuit 1000 and 2000 are shown. It is noted that although FIGS. 10 and 11 diagrammatically show the method steps in a particular order, the methods are not necessarily intended to be limited to being performed in the shown order. Rather at least some of the shown steps may be performed in an overlapping manner, in a different order, and/or simultaneously.

The hydraulic circuit 100 can be operated in a lifting mode of operation 1000, as shown in FIG. 10. In a first step 1002 of the method 1000, the electronic controller 500 receives an indication from the user that a lifting mode of operation is desired. This indication may come from a variety of user inputs. For example, the user may move the lever 518 associated with the lifting cylinder 40. Another example is the user selecting the mode directly or indirectly through the use of a user interface of the control system 500. For the purpose of simplicity, the system can be said to be in a work standby mode at step 1002, wherein the first control valve assembly 20 is in a closed or neutral position 20B and the pump pressure is controlled to a value that is independent of the measured lift cylinder hydraulic pressure.

In a second step 1004, the controller 500 commands the first control valve assembly 20 into the lifting position 20A. In the embodiment shown, this is achieved by actuating valve 46 via solenoid actuator 502. In a third step 1006, the controller 500 commands the second control valve assembly 20 to open once the load-sense pressure sensor 514 is near cylinder pressure 510.

The hydraulic circuit may also be operated in a lowering mode of operation 2000, as shown in FIG. 11. In a first step 2002 of the method 2000, the electronic controller 500 receives an indication from the user that a lowering mode of operation is desired. This indication may come from a variety of user inputs, as already described above.

In a second step 2004, the hydraulic cylinder pressure, as measured at sensor 510, is compared to the load-sense pressure, as measured at valve 62 via sensor 514. It is noted that step 2004 may also include a comparison between the measured values for pressure sensors 516 and 514 instead of or in addition to a comparison between the measured values for pressure sensors 510 and 514. If the hydraulic cylinder pressure is greater than the load-sense pressure by a pressure margin, then the method proceeds to step 2006. Otherwise, the method proceeds to step 2010. In one embodiment, the pressure margin is 5 bar. At step 2006, the first control valve assembly 50 is positioned into the first lowering position 20C. At step 2008, proportional flow control is then used for the second control valve assembly 20 to control the speed of the load 44. At step 2010, the first control valve assembly 50 is positioned into the second lowering position 20D. At step 2012, the second control valve assembly 20 is actuated to control to a pressure at the hydraulic cylinder 40, as measured by sensor 510. As shown in FIG. 11, the system continually monitors the relationship between the hydraulic cylinder pressure at sensor 510 and the load-sense pressure at valve 62 via sensor 514 and/or the pressure at sensor 516. When optional sensor 516 is used, this monitoring allows the controller 500 to determine the appropriate position for the first control valve assembly 20 and the optimal control for the second control valve assembly 50 by maintaining a delta (pressure difference) across either control valve 50 or across both control valves 20, 50.

Second Embodiment

Referring to FIGS. 12 to 16, a second embodiment of a first control valve assembly 20' is presented. As many of the concepts and features are similar to the first embodiment shown in FIGS. 1-9, the description for the first embodiment is hereby incorporated by reference for the second embodiment. Where like or similar features or elements are shown, the same reference numbers will be used where possible. The following description for the second embodiment will be limited primarily to the differences between the first and second embodiments.

Figure 13:
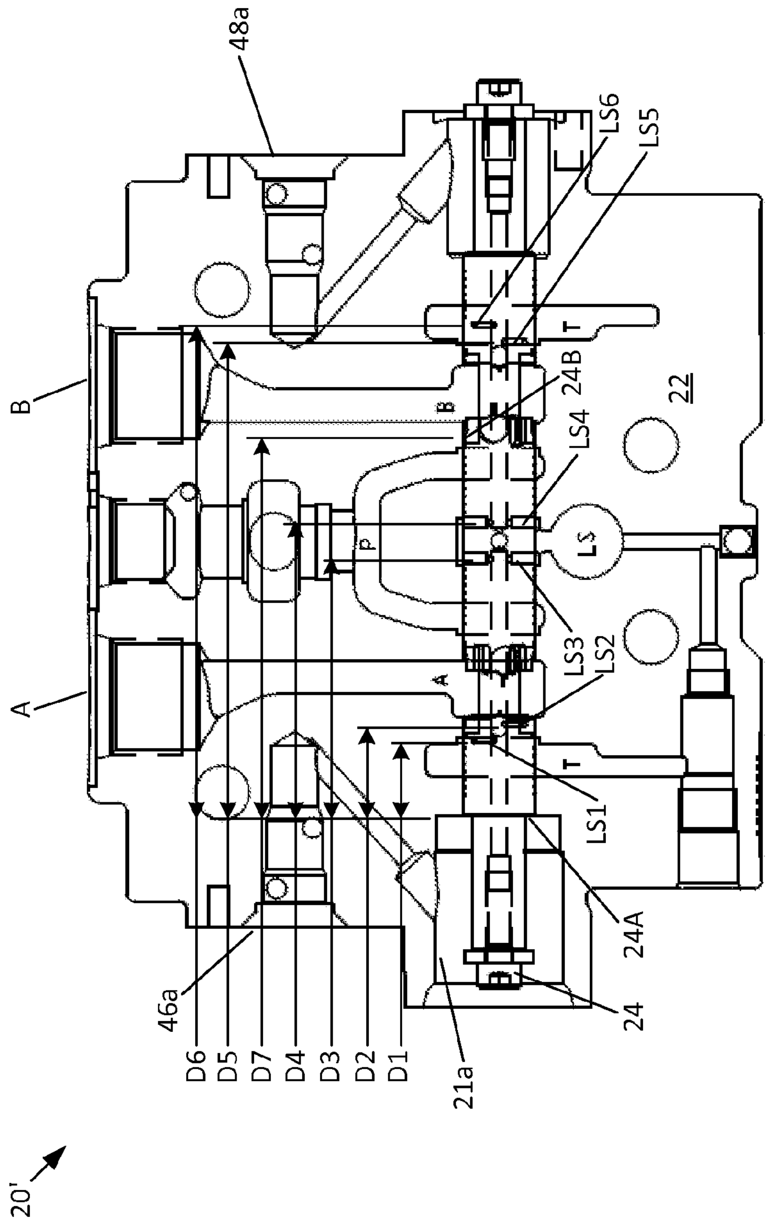
FIG. 13 is a cross-sectional view of the valve assembly shown in FIG. 10, with the valve assembly in a second position.
Figure 14:
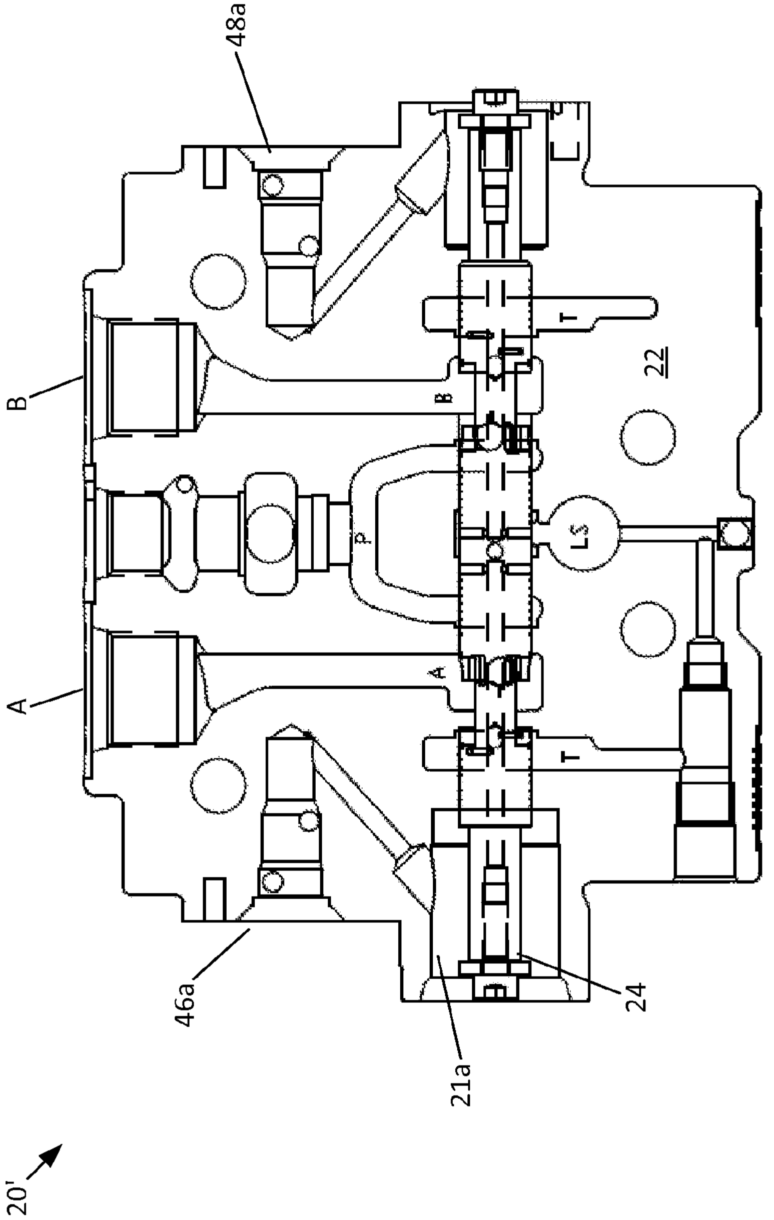
FIG. 14 is a cross-sectional view of the valve assembly shown in FIG. 10, with the valve assembly in a third position.
Figure 15:
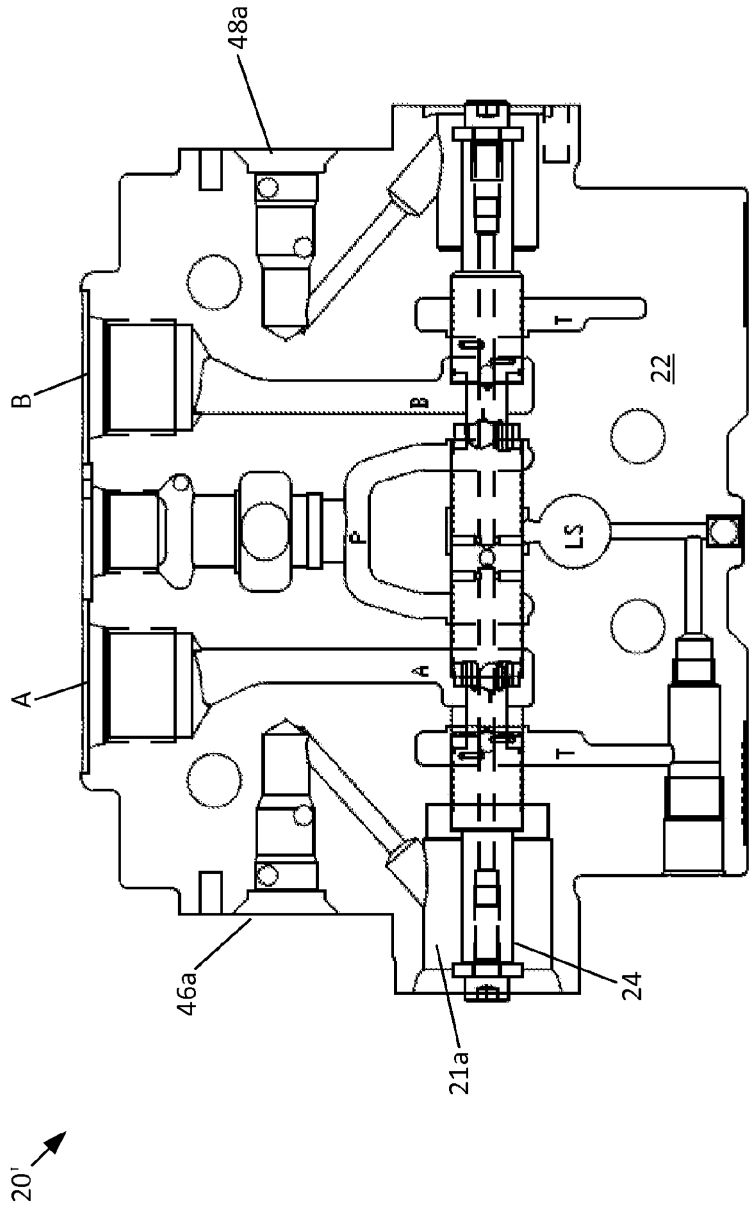
FIG. 15 is a cross-sectional view of the valve assembly shown in FIG. 10, with the valve assembly in a fourth position.
Figure 16:
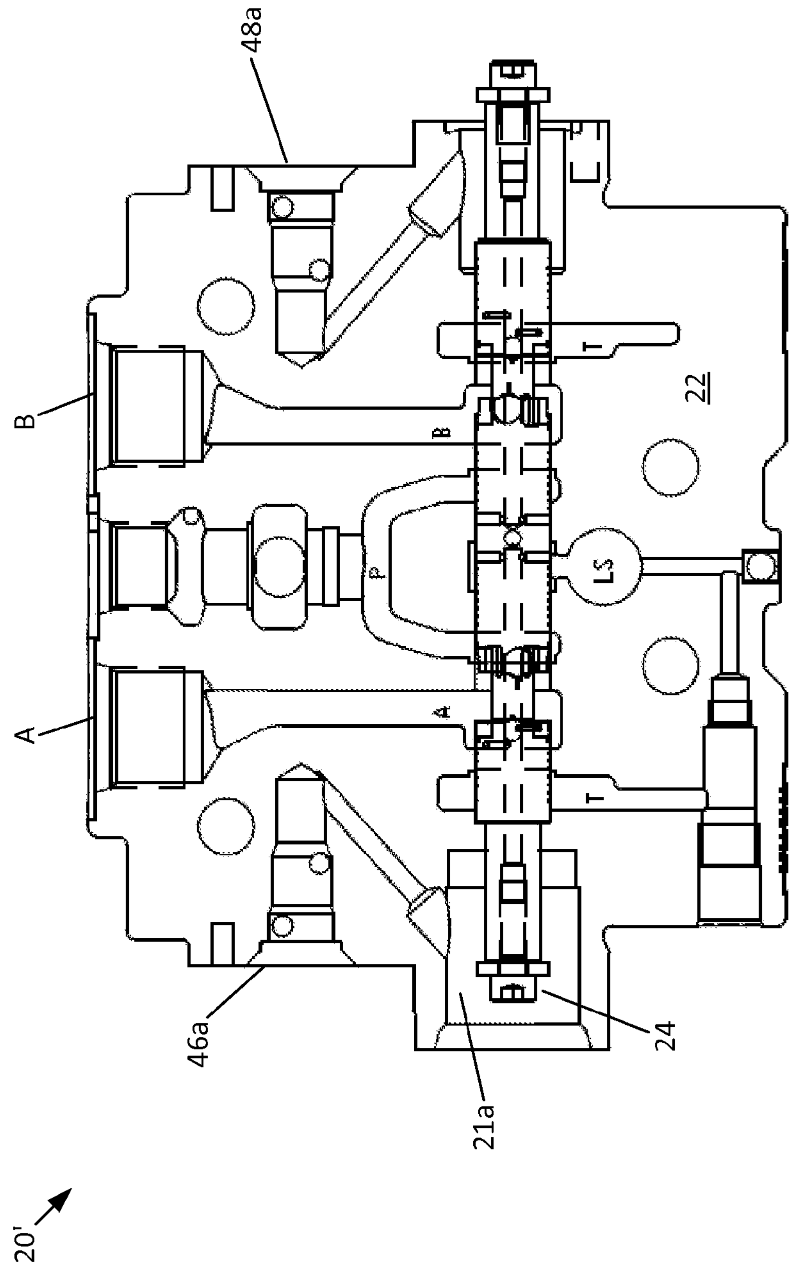
FIG. 16 is a cross-sectional view of the valve assembly shown in FIG. 10, with the valve assembly in a first position.

The first control valve assembly 20' may be utilized in circumstances where anti-cavitation valves 52, 54 are not provided in the hydraulic circuit and a fluid path from the fluid reservoir 34 to the hydraulic actuator 40 must be provided through the valve assembly 20'. To accomplish this functionality, the valve assembly 20' is provided with a modified first lifting position 20C and with a delayed timing. Referring to FIG. 13, the B port timing of the valve spool 24 is delayed such that fluid is allowed to enter chamber 40B since there are no antic-cavitation valves. In the embodiment shown, this is accomplished by spacing a second edge 24B of the spool 24 by a distance D7 from the first edge 24A. In the embodiment shown, D7 is about 71.00 mm.

In the first lowering position 20C for valve assembly 20' the spool 24 is positioned such that ports 29C and 26C are placed in fluid communication with each other. This is the same arrangement as shown for the first valve assembly 20. However, valve assembly 20' is configured such that ports 28C and 30C are in fluid communication with each other instead of being blocked off. Accordingly, the hydraulic pressure from the first chamber 40A of the hydraulic cylinder 40 provides an input into the load-sense valve 62 for control valve assembly 20' which introduces a timing delay into the system for better control.

Referring to FIGS. 13-16, an exemplary physical embodiment of the second embodiment of the first valve assembly 20' is shown. As configured, the first valve assembly 20 has: a tank passage T configured to be placed in fluid communication with the fluid reservoir 34; a load-sense passage LS configured to be placed in fluid communication with the load-sense valve 62; a pump passage P configured to be placed in fluid communication with the pump 32; a first outlet port A in fluid communication with the first chamber 40A of the hydraulic cylinder 40 via the second valve assembly 50; and a second outlet port B configured to be placed in fluid communication with the second chamber 40B of the hydraulic cylinder. The first control valve assembly 20 is also shown as having a first recess 21*a* for receiving spring 21. In one embodiment, two separate centering springs may be provided. A first pilot port 46*a* and a second pilot port 48*a* are also shown for receiving pilot pressure from the valves 46 and 48, respectively. It is noted that the above referenced ports for the valve assembly 20' and body 22 correspond to ports provided on the spool 24, depending upon the position of the spool 24. For example: the first outlet port A can be selectively opened to ports 29A-D; the second outlet port B can be selectively opened to ports 30A-D; the pump passage P can be selectively opened to ports 28A-D; the tank passage T can be selectively opened to ports 26A-D; and the load-sense passage LS can be selectively opened to ports 27A-D. The various spool positions and functions are generally the same as described above for the first embodiment of the first valve assembly 20, and will not be discussed here further.

Referring specifically to FIG. 13, physical load sense orifices LS1, LS2, LS3, LS4, LS5, and LS, in fluid communication with internal passageways of the spool 24, are shown. In the exemplary embodiment shown the load sense orifices LS1, LS2, LS3, LS4, LS5, and LS6 are a distance D1, D2, D3, D4, D5, and D6 from an edge 24A of the spool 24, respectively. In one embodiment, D1 is about 14.5 millimeters (mm); D2 is about 17.6 mm; D3 is about 49.5 mm; D4 is about 56.5 mm; D5 is about 91.4 mm; and D6 is about 94.6 mm. In one embodiment, LS1, LS2, LS5, and LS6 have a diameter of about 1.0 mm while LS3 and LS4 have a diameter of about 2.0 mm. In one aspect, the distance and diameters are subjective to the requirements of the work implement.

As should be appreciated, the above described process and related disclosures allow for the system to operate the pump in a more economical manner by only commanding the pump to greater output when it can be ascertained beforehand that the pump is actually needed to lower the load 44. As such, significant operating savings can be achieved by allowing the pump to remain at stand-by pressure and no flow when lowering with gravity alone, as compared to systems including pilot check valves or counterbalance valves. Accordingly, one will appreciate that horsepower and fuel savings for the vehicle result from using an approach in accordance with the concepts presented herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic circuit for lifting and lowering a load, the hydraulic circuit comprising:

(a) a hydraulic pump, a fluid reservoir, and a hydraulic actuator having a first chamber and a second chamber;

(b) a first control valve assembly disposed between the hydraulic pump and the hydraulic actuator; and (c) a second control valve assembly disposed between the first control valve assembly and the first chamber of the hydraulic actuator, the second control valve assembly having:

i. a first position in which hydraulic fluid is blocked from exiting the first chamber, but is allowed to flow into the first chamber;

ii. a second position in which hydraulic fluid is allowed to enter or exit the first chamber of the hydraulic actuator;

(d) the first control valve assembly being movable to a first lowering position wherein the second control valve assembly is in fluid communication with the fluid reservoir through the first control valve assembly, and a second lowering position including: i. the second control valve assembly being in fluid communication with the fluid reservoir through the first control valve assembly and ii. the second chamber of the hydraulic actuator being placed in fluid communication with the hydraulic pump through the first control valve assembly;

(e) wherein the load can be selectively lowered by the hydraulic circuit with gravity alone when the first control valve assembly is in the first lowering position and the second control valve assembly is in the second position without requiring the hydraulic pump to provide output pressure, output fluid flow, or both output pressure and output fluid flow; and (f) an electronic control system configured to operate the first control valve assembly and the second control valve assembly, wherein the control system includes a first chamber pressure sensor located between the first chamber of the hydraulic actuator and the second control valve assembly, wherein the control system includes a load-sense valve for measuring a load-sense pressure, wherein the control system is configured to selectively command the first valve assembly between the first and second lowering positions based upon the relationship between the load-sense pressure and the first chamber pressure.

2. The hydraulic circuit of claim 1, wherein the load can be selectively lowered by the hydraulic circuit with power from the hydraulic pump when the first control valve assembly is in the second lowering position and the second control valve assembly is in the second position.

3. The hydraulic circuit of claim 1, further comprising:

(a) a first anti-cavitation valve in fluid communication with the fluid reservoir and the second control valve assembly, the first anti-cavitation valve allowing for hydraulic fluid to flow from the fluid reservoir to the hydraulic actuator first chamber at a preselected hydraulic pressure.

4. The hydraulic circuit of claim 3, further comprising:

(a) a second anti-cavitation valve in fluid communication with the fluid reservoir and the hydraulic actuator second chamber, the second anti-cavitation valve allowing for hydraulic fluid to flow from the fluid reservoir to the hydraulic actuator second chamber at a preselected hydraulic pressure.

5. The hydraulic circuit of claim 1, wherein fluid from the second chamber of the hydraulic actuator is blocked from flowing through the first control valve assembly when the first control valve assembly is in the first lowering position.

6. A method of operating a hydraulic circuit comprising:

(a) providing a first control valve assembly in fluid communication with a hydraulic actuator and a hydraulic pump, the first control valve assembly having a first lowering position and a second lowering position;

(b) providing a second control valve assembly disposed between the first control valve assembly and the hydraulic actuator;

(c) receiving a user indication that a load lowering operation is desired; and (d) determining whether a pressure in the hydraulic actuator is greater than a load-sense pressure associated with the first control valve assembly by a pressure margin value;

i. where the pressure in the hydraulic actuator is greater than the load-sense pressure by the pressure margin value:

1. actuating the first control valve assembly to the first lowering position and proportionally controlling the second control valve assembly to maintain a pressure differential set point such that the load is selectively lowered by gravity alone without requiring the hydraulic pump to provide output pressure, output fluid flow, or both output pressure and output fluid flow;

ii. where the pressure in the hydraulic actuator is lower than the load-sense pressure by the pressure margin value 1. actuating the first control valve assembly to the second lowering position and controlling the second control valve assembly to maintain a pressure at the hydraulic actuator such that the load can be lowered with power from the hydraulic pump.

7. The method of operating a hydraulic circuit of claim 6, wherein:

(a) the step of proportionally controlling the second control valve assembly to maintain a pressure differential set point includes taking into account a comparison between the hydraulic actuator pressure and a third pressure value that is equal to a measured fluid pressure between the second control valve assembly and the first control valve assembly; and (b) the step of controlling the second control valve assembly to maintain a pressure at the hydraulic actuator includes taking into account a comparison between the hydraulic actuator pressure and the third pressure value.

8. The hydraulic circuit of claim 6, further including the steps of:

(a) providing a first anti-cavitation valve in fluid communication with the fluid reservoir and the second control valve assembly; and (b) allowing for hydraulic fluid to flow through the first anti-cavitation valve from the fluid reservoir to the hydraulic actuator first chamber at a preselected hydraulic pressure.

9. The hydraulic circuit of claim 8, further including the steps of:

(a) providing a second anti-cavitation valve in fluid communication with the fluid reservoir and the hydraulic actuator second chamber, (b) allowing for hydraulic fluid to flow through the second anti-cavitation valve from the fluid reservoir to the hydraulic actuator second chamber at a preselected hydraulic pressure.

* * * * *